(12) United States Patent
Wang (10) Patent No.: US 9,587,753 B2
(45) Date of Patent: Mar. 7, 2017

(54) AIR VALVE CONNECTING DEVICE HAVING AUTOMATIC GRIPPING STRUCTURE

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

( * ) Notice: Subject to any disclaimer, the term of this patent is extended or adjusted under 35 U.S.C. 154(b) by 0 days.

(21) Appl. No.: 14/615,497

(22) Filed: Feb. 6, 2015

(65) Prior Publication Data

US 2015/0330525 A1   Nov. 19, 2015

(30) Foreign Application Priority Data

May 14, 2014 (TW) .............................. 103208357 U (51) Int. Cl.
*F16K 15/20* (2006.01)
*F16K 3/24* (2006.01)
*F16K 51/00* (2006.01)

(52) U.S. Cl.
CPC .............. *F16K 15/20* (2013.01); *F16K 3/243* (2013.01); *F16K 51/00* (2013.01); *Y10T 137/3724* (2015.04)

(58) Field of Classification Search
CPC . F16K 15/20; F16K 3/243; F16K 1/04; F16K 3/262; F16K 3/267; F16K 51/00; Y10T 137/3724; Y10T 137/3584; F16L 37/28; B60C 29/06; B60S 5/04

USPC ................................................... 137/223, 231
See application file for complete search history.

(56) References Cited

U.S. PATENT DOCUMENTS

| | | | |
|---|---|---|---|
| 5,960,815 A | 10/1999 | Wang | |
| 6,105,600 A | 8/2000 | Wang | |
| 6,105,601 A | 8/2000 | Wang | |
| 6,328,057 B1 | 12/2001 | Wang | |
| 7,866,335 B2 | 1/2011 | Wang | |
| 8,539,971 B2 | 9/2013 | Wang | |
| 9,133,970 B2 * | 9/2015 | Wang | |

FOREIGN PATENT DOCUMENTS

DE   29923064 U1 *   3/2000
IT     0690231 A1 *   1/1996

* cited by examiner

*Primary Examiner* — Craig J Price
(74) *Attorney, Agent, or Firm* — Charles E. Baxley (57) ABSTRACT

An air valve connecting device includes a housing, a sliding member slidably engaged in the housing and having a pathway selectively aligning with a passage of the housing, and the sliding member includes a mouth for engaging with an inflation valve, a gasket is attached to the sliding member and includes a bore for engaging with the inflation valve, and a number of pawls are engaged with the gasket and each include a lower portion extendible out of the housing for engaging with the peripheral rib of the housing, and the peripheral rib of the housing is engaged with the lower portions of the pawls for forcing the pawls to force the gasket to grasp the inflation valve to the sliding member.

6 Claims, 8 Drawing Sheets

AIR VALVE CONNECTING DEVICE HAVING AUTOMATIC GRIPPING STRUCTURE

BACKGROUND OF THE INVENTION

1. Field of the Invention

The present invention relates to an air valve connecting head or device, and more particularly to an air valve connecting device including a simplified or improved structure for easily connecting to various inflation valves and having an automatic gripping structure for being easily actuated or operated with a single hand of the user and for being easily manufactured with a decreased manufacturing cost.

2. Description of the Prior Art

Typical air valve connecting devices comprise a valve housing including one end for connecting or coupling to a pressurized air reservoir and for receiving the pressurized air from the pressurized air reservoir, and a fitting port formed in the other end of the valve housing for receiving or engaging with an inflation valve and for inflating the balls, the inner tires of the bicycles or the motorcycles or the vehicles, the present inventor has developed various kinds of air valve connecting devices.

For example, U.S. Pat. No. 5,960,815 to Wang, U.S. Pat. No. 6,105,600 to Wang, U.S. Pat. No. 6,105,601 to Wang, U.S. Pat. No. 6,328,057 to Wang, U.S. Pat. No. 7,866,335 to Wang, and U.S. Pat. No. 8,539,971 to Wang disclose several of the typical air valve connecting heads for a hand-held air pump and also comprising a valve housing including one end for connecting or coupling to a pressurized air reservoir, and including a fitting port formed in an elastic annular block for engaging with an inflation valve.

However, normally, the typical air valve connecting heads required to be provided with an actuating handle or hand grip to be grasped or held or operated with one hand of the user, and the user has to use the other hand to grasp and actuate the valve housing, such that the typical air valve connecting heads comprise a structure that may not be easily operated or may not effectively grasping or holding the different inflation valves.

The present invention has arisen to mitigate and/or obviate the afore-described disadvantages of the conventional air valve connecting devices.

SUMMARY OF THE INVENTION

The primary objective of the present invention is to provide an air valve connecting device including a simplified or improved structure for easily connecting to various inflation valves and for being easily actuated or operated with a single hand of the user and having an automatic gripping structure for being easily manufactured with a decreased manufacturing cost.

In accordance with one aspect of the invention, there is provided an air valve connecting device comprising a housing including a chamber formed therein, and including a first end portion, and including a second end portion, the housing including a passage formed therein and communicating with the chamber of the housing, and the housing including a peripheral rib extended radially into the chamber of the housing at the first end portion of the housing, a sliding member slidably engaged in the chamber of the housing. the sliding member including a pathway laterally formed therein for selectively aligning and communicating with the passage of the housing, and the sliding member including a mouth formed therein and communicating with the pathway of the sliding member for selectively engaging with an inflation valve, a gasket attached to the sliding member and including a bore formed therein and communicating with the mouth of the sliding member for selectively engaging with the inflation valve, and a grasping device including a number of pawls engaged with the gasket, the pawls each include a lower portion extendible out of the first end portion of the housing for selectively engaging with the peripheral rib of the housing, and the peripheral rib of the housing is engaged with the lower portions of the pawls for selectively forcing the pawls radially inward and toward each other and to compress the gasket to engage with the inflation valve, and to resiliently clamp and grasp the inflation valve to the sliding member when the gasket and the pawls are moved into the chamber of the housing, and thus for allowing the air valve connecting device to be easily actuated or operated with a single hand of the user.

The gasket includes a peripheral recess formed in an outer peripheral portion of the gasket, and the pawls each include a protrusion extended radially and inwardly and engaged with the peripheral recess of the gasket for anchoring or securing the pawls to the gasket.

The gasket includes a number of bulges extended radially and outwardly for forming a number of depressions in an outer peripheral portion of the gasket and for engaging with the pawls respectively and also for anchoring or securing the pawls to the gasket.

The pawls each include an ear extended radially and inwardly and engaged into the sliding member for anchoring or securing the gasket and the pawls to the sliding member. The pawls each include a flap extended radially and inwardly and engageable with the gasket for anchoring or securing the gasket and the pawls to the sliding member.

The sliding member includes a knob provided on top of the sliding member and extendible out of the second end portion of the housing. The housing includes a peripheral flange extended radially and inwardly into the chamber of the housing at the second end portion of the housing for forming an inner peripheral shoulder in the second end portion of the housing and for selectively engaging with the sliding member.

The housing includes a cover attached to the first end portion of the housing. The housing includes an outer thread formed in the first end portion of the housing, and the cover includes an inner thread formed therein for engaging with the outer thread of the housing and for detachably threading and securing the cover to the housing. The peripheral rib of the housing is extended radially and inwardly into the cover and extended into the chamber of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
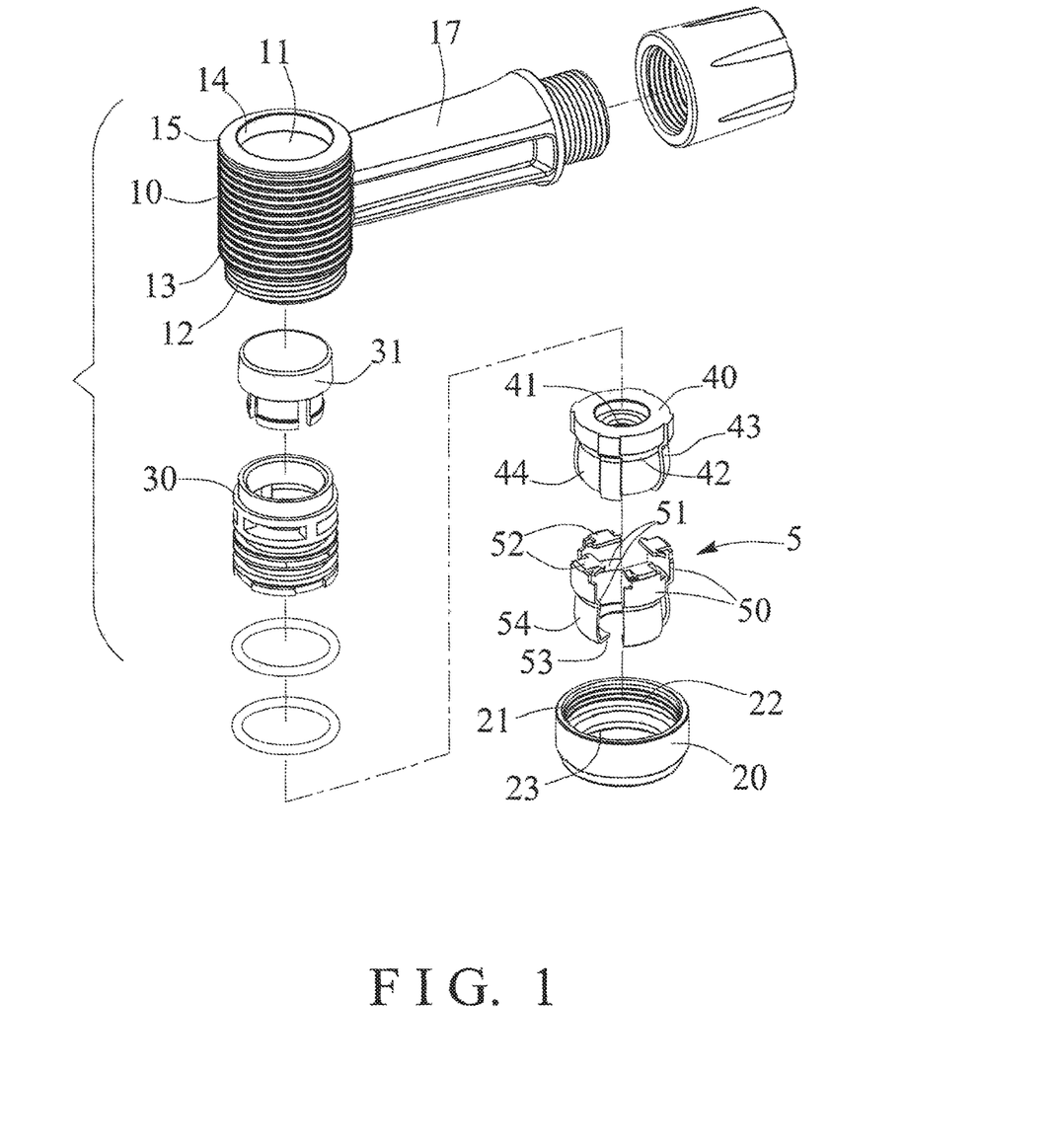
FIG. 1 is a partial exploded view of an air valve connecting device in accordance with the present invention.
Figure 2:
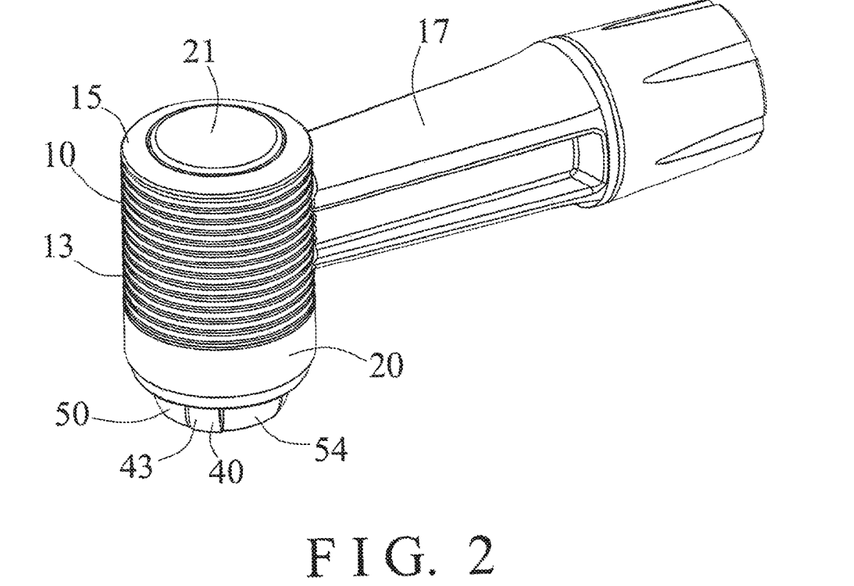
FIG. 2 is a perspective view of the air valve connecting device.
Figure 3:
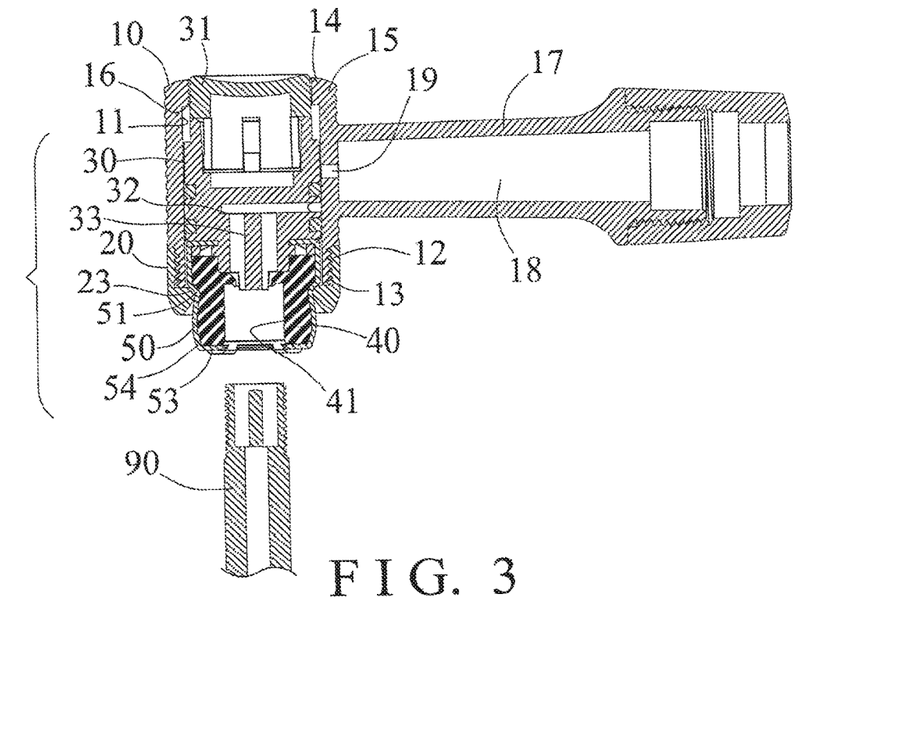
FIG. 3 is partial cross sectional view of the air valve connecting device.

Referring to the drawings, and initially to FIGS. 1-3, an air valve connecting device in accordance with the present invention comprises a head body or housing 10 including a chamber 11 formed therein, and including an outer thread 12 formed in the one or first or lower end portion 13 thereof, and including a peripheral flange 14 extended radially and inwardly into the chamber 11 of the housing 10 at the other or second or upper end portion 15 of the housing 10 for forming or defining an inner peripheral shoulder 16 in the second end portion 15 of the housing 10, and including a cylindrical casing 17 laterally extended from the housing 10 and substantially perpendicular to the housing 10, and including a bore 18 formed in the cylindrical casing 17 for coupling to an air pump (not illustrated), a pressurized air reservoir or the like, and including a passage 19 formed therein and communicating with the chamber 11 of the housing 10 and the bore 18 of the cylindrical casing 17.

The housing 10 includes a cover 20 attached or secured to the first or lower end portion 13 thereof, for example, the cover 20 includes a compartment 21 and/or a screw hole or an inner thread 22 formed therein (FIG. 1) for threading or engaging with the outer thread 12 of the housing 10 and for detachably or releasably attaching or securing the cover 20 to the housing 10. Alternatively, the cover 20 may be molded and formed integral with the housing 10. The cover 20 may include a peripheral rib 23 extended radially and inwardly into the screw hole or compartment 21 of the cover 20, and also extended into the chamber 11 of the housing 10, best shown in FIGS. 3 and 4; or the housing 10 includes the peripheral rib 23 extended radially and inwardly into the chamber 11 of the housing 10 at the one or first or lower end portion 13 of the housing 10.

An actuator or actuating or sliding member 30 is slidably engaged in the chamber 11 of the housing 10 and contactable or engageable with the inner peripheral shoulder 16 and/or the peripheral flange 14 of the housing 10 for being confined and limited within the chamber 11 of the housing 10 and for being prevented from being disengaged or separated from the housing 10 through the second end portion 15 of the housing 10, and the peripheral rib 23 of the housing 10 or of the cover 20 may also be used to anchor or retain the sliding member 30 within the chamber 11 of the housing 10. The sliding member 30 includes a button or knob 31 formed or provided on top of the sliding member 30 and slidable or extendible out of the second end portion 15 of the housing 10 for being depressed or compressed or actuated by the user. The knob 31 may be molded and formed integral with the sliding member 30 and moved in concert with the sliding member 30.

Figure 4:
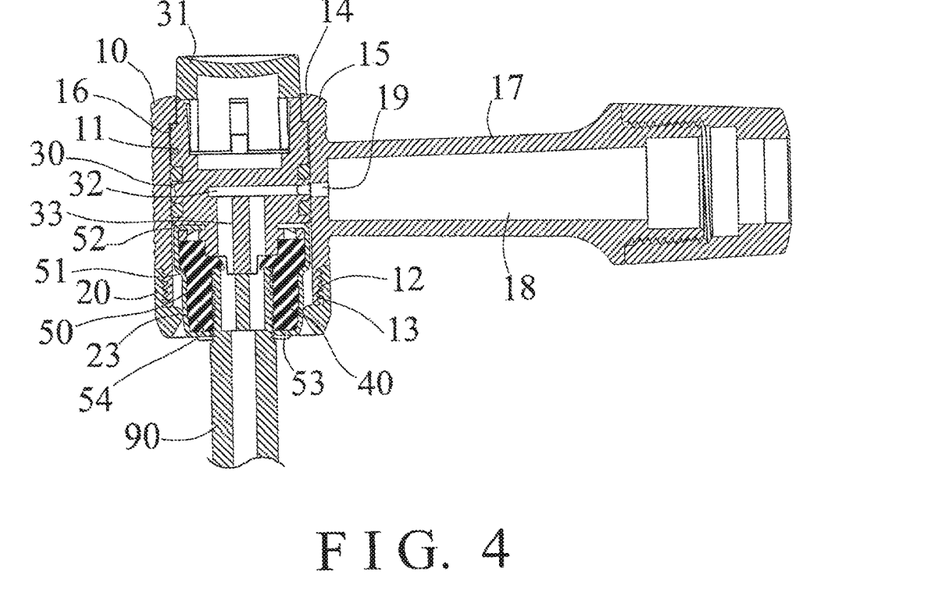
FIG. 4 is another partial cross sectional view similar to FIG. 3, illustrating the operation of the air valve connecting device.

The sliding member 30 includes a passage or pathway 32 laterally formed in the middle or intermediate portion of the sliding member 30 for selectively aligning or communicating with the passage 19 and the bore 18 of the cylindrical casing 17, best shown in FIG. 4, and for selectively receiving the pressurized air from the air reservoir or hand-held air pump (not illustrated) or the like. The sliding member 30 includes an opening or mouth 33 formed therein, such as formed in the lower portion or bottom of the sliding member 30 and communicating with the pathway 32 of the sliding member 30 for allowing the pressurized air to selectively flow from the pathway 32 to the mouth 33 of the sliding member 30 (FIG. 4) and then to flow out of the sliding member 30 selectively. The mouth 33 is formed through the lower portion or bottom of the sliding member 30 for receiving or engaging with an inflation valve 90 (FIGS. 3, 4), such as the U.S. type valve 90, the French type, or the other inflation valve or the like.

A cylindrical barrel or gasket 40 is made of soft or resilient materials, such as rubber, plastic, composite materials, or other synthetic materials for resiliently clamping or grasping the inflation valve 90, and engaged into the chamber 11 of the housing 10 and attached onto the sliding member 30 and moved in concert with the sliding member 30, and the gasket 40 includes a bore 41 formed therein (FIG. 3) and communicating with the mouth 33 of the sliding member 30 for selectively receiving or engaging with an inflation valve 90 (FIG. 4) and for allowing the inflation valve 90 to be engaged through the bore 41 of the gasket 40 and to be engaged with the mouth 33 of the sliding member 30. The gasket 40 includes a peripheral depression or recess 42 formed in the outer peripheral portion thereof, and one or more (such as four) swellings or bulges 43 extended radially and outwardly from the outer peripheral portion thereof and equally spaced from each other for forming or defining four depressions 44 in the outer peripheral portion thereof. The peripheral rib 23 of the housing 10 or of the cover 20 may also be used to anchor or retain the gasket 40 within the chamber 11 of the housing 10.

A gripping or grasping device 5 includes one or more (such as four) spring blades or jaws or pawls 50 engaged into the depressions 44 of the gasket 40 respectively, the pawls 50 each include a recess or protrusion 51 extended radially and/or inwardly from the middle or intermediate portion thereof for engaging with the peripheral recess 42 of the gasket 40 and for solidly and stably anchoring or retaining or positioning the pawls 50 to the gasket 40, and each include a flap or ear 52 extended radially and inwardly from the upper portion thereof and fitted or engaged into the lower portion of the sliding member 30 (FIGS. 3, 4) for solidly and stably anchoring or securing the gasket 40 and the pawls 50 to the sliding member 30, and thus for allowing the gasket 40 and the pawls 50 to be moved in concert with the sliding member 30. The pawls 50 each include an ear or flap 53 extended radially and inwardly from the lower portion thereof and contactable or engageable with the gasket 40 for further solidly and stably anchoring or securing the gasket 40 and the pawls 50 to the sliding member 30.

As shown in FIGS. 1 and 3-4, the pawls 50 each include a tilted or curved bottom or lower portion 54 located below the protrusions 51 and extendible out of the cover 20 and the first end portion 13 of the housing 10 (FIG. 3) for selectively contacting or engaging with the peripheral rib 23 of the cover 20 or of the housing 10, and/or the peripheral rib 23 of the housing 10 or of the cover 20 may contact or engage with the tilted or curved lower portions 54 of the pawls 50 for selectively forcing the pawls 50 radially inward and toward each other and also for selectively squeezing or compressing the gasket 40 toward the inflation valve 90, and thus for resiliently clamping or grasping the inflation valve 90 to the sliding member 30 when the gasket 40 and the pawls 50 are forced or moved into the chamber 11 of the housing 10 with the inflation valve 90, for example, such that the air valve connecting device in accordance with the present invention may be easily actuated or operated with a single hand of the user. The knob 31 of the sliding member 30 may force and move the gasket 40 and the inflation valve 90 out of the housing 10 after the inflation operation.

In operation, as shown in FIG. 3, when the gasket 40 and the tilted or curved lower portions 54 of the pawls 50 are extended or located out of the housing 10 and the cover 20, the peripheral rib 23 of the housing 10 or of the cover 20 may contact or engage with the protrusions 51 of the pawls 50 and may anchor or position the gasket 40 and the sliding member 30 to the housing 10, at this moment, the peripheral rib 23 of the housing 10 or of the cover 20 is not contacted or engaged with the tilted or curved lower portions 54 of the pawls 50 to squeeze or compress the gasket 40, such that the bore 41 of the gasket 40 is opened for allowing the inflation valve 90 to be engaged through the bore 41 of the gasket 40 and to be engaged with the mouth 33 of the sliding member 30. As shown in FIG. 4, when the inflation valve 90 is engaged into the bore 41 of the gasket 40 and engaged with the mouth 33 of the sliding member 30, the inflation valve 90 and/or the hand of the user may force and move the gasket 40 and the sliding member 30 into the chamber 11 of the housing 10, and the peripheral rib 23 of the housing 10 or of the cover 20 may force the pawls 50 to squeeze and compress the gasket 40 to resiliently clamp and grasp the inflation valve 90 to the sliding member 30.

Figure 5:
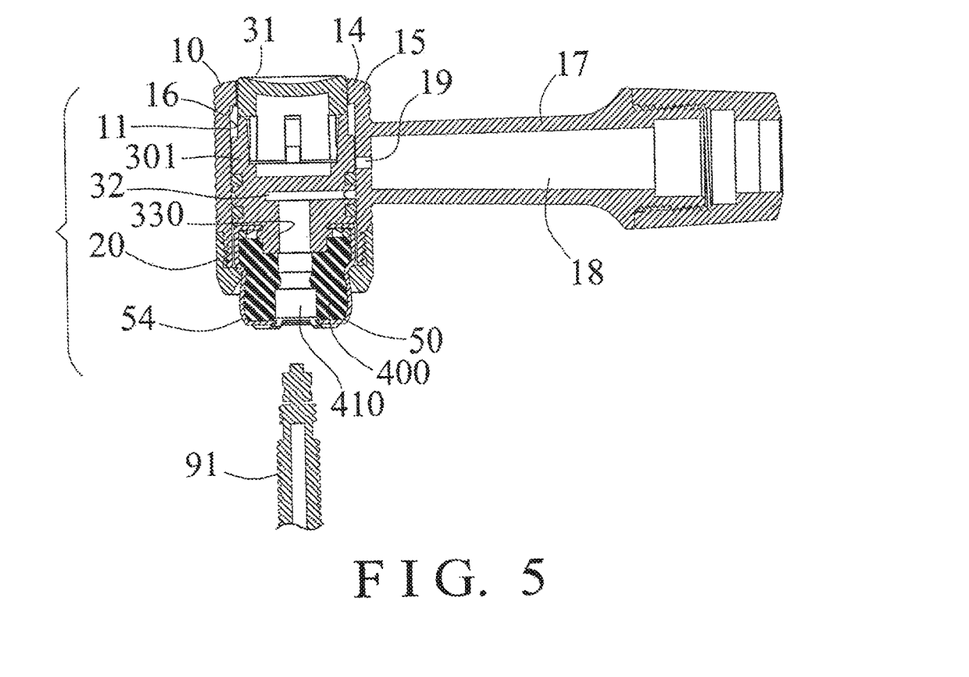
FIGS. 5, 6 are cross sectional views similar to FIGS. 3 and 4, illustrating the other arrangement of the air valve connecting device.
Figure 6:
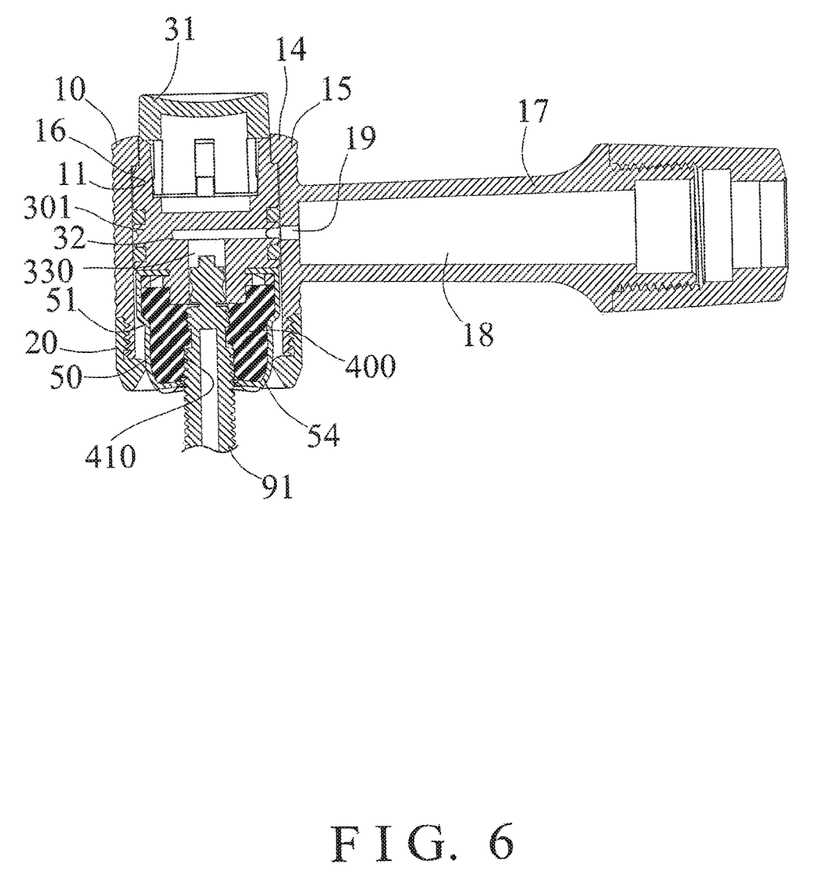
Figure 7:
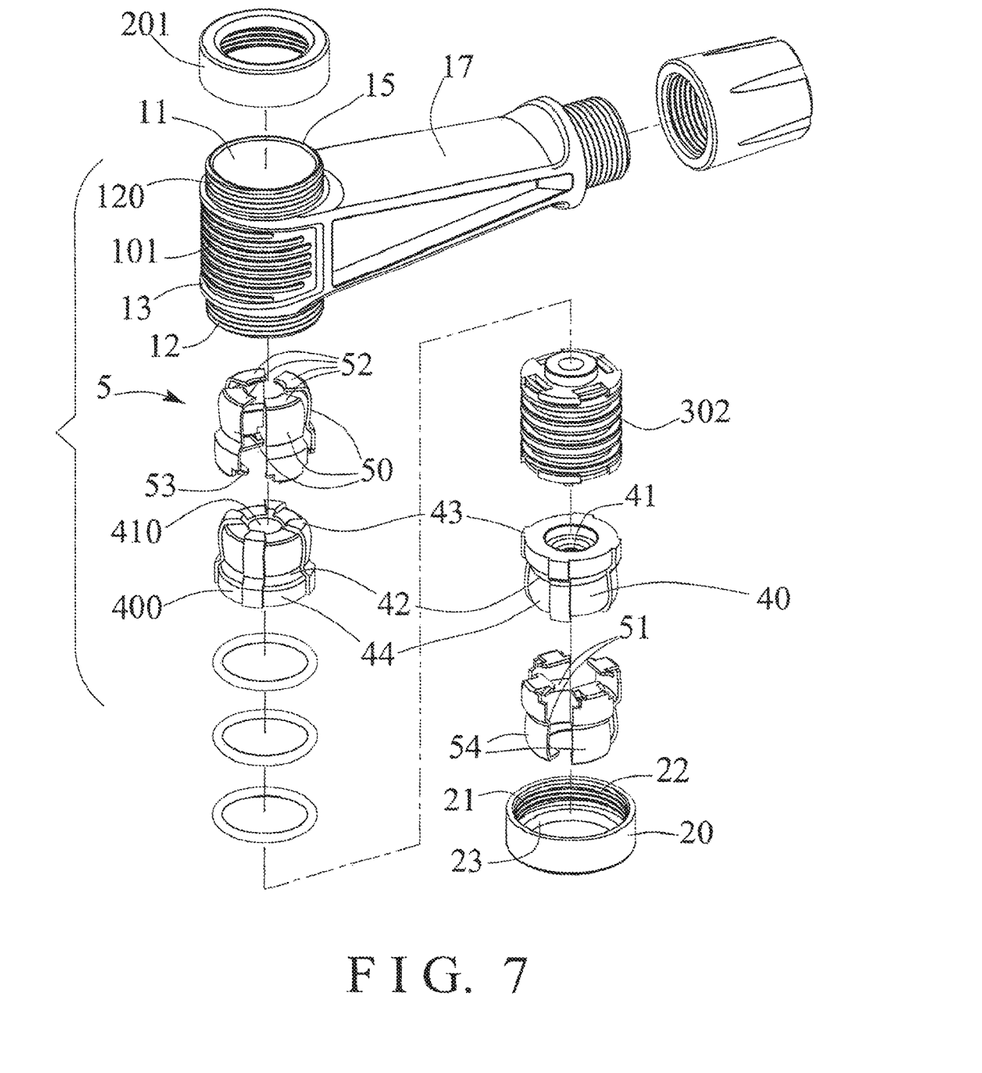
FIG. 7 is another partial exploded view illustrating the further arrangement of the air valve connecting device.
Figure 8:
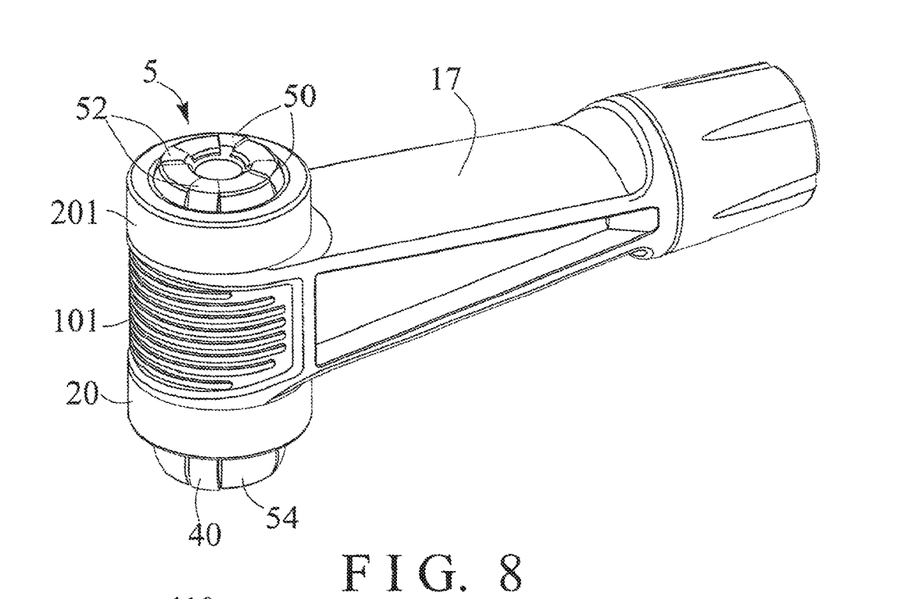
FIG. 8 is a perspective view of the air valve connecting device as shown in FIG. 7.
Figure 9:
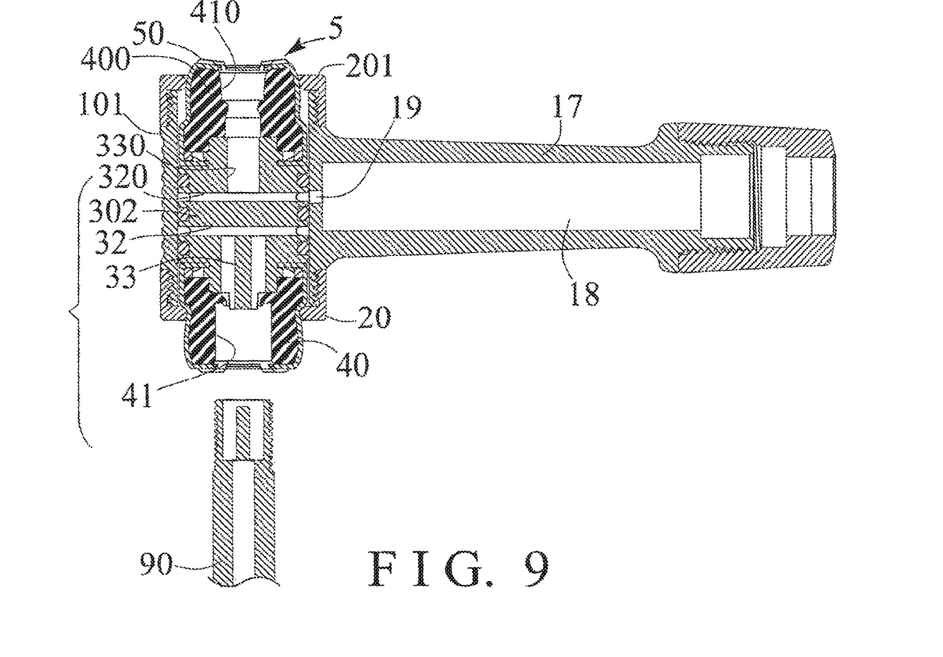
FIGS. 9, 10, 11, 12 are cross sectional views illustrating the operation of the air valve connecting device as shown in FIGS. 7 and 8.
Figure 10:
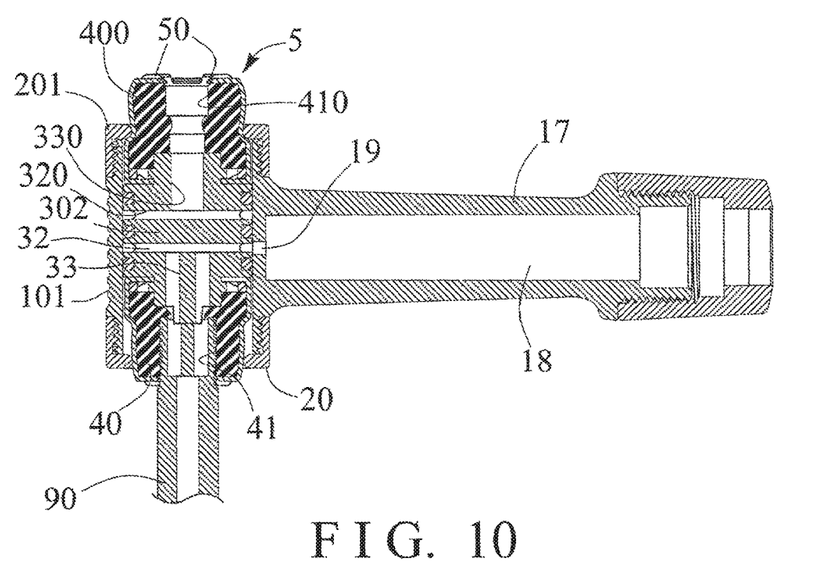
Figure 11:
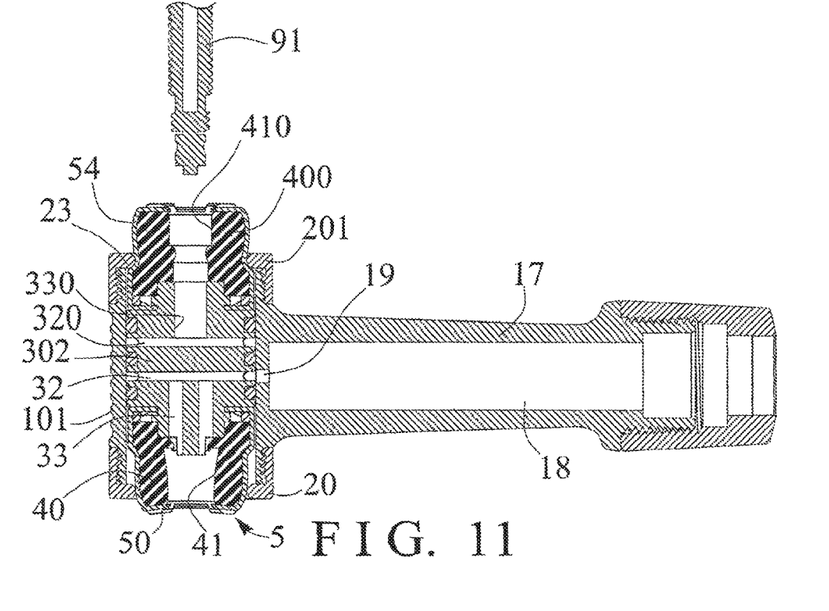
Figure 12:
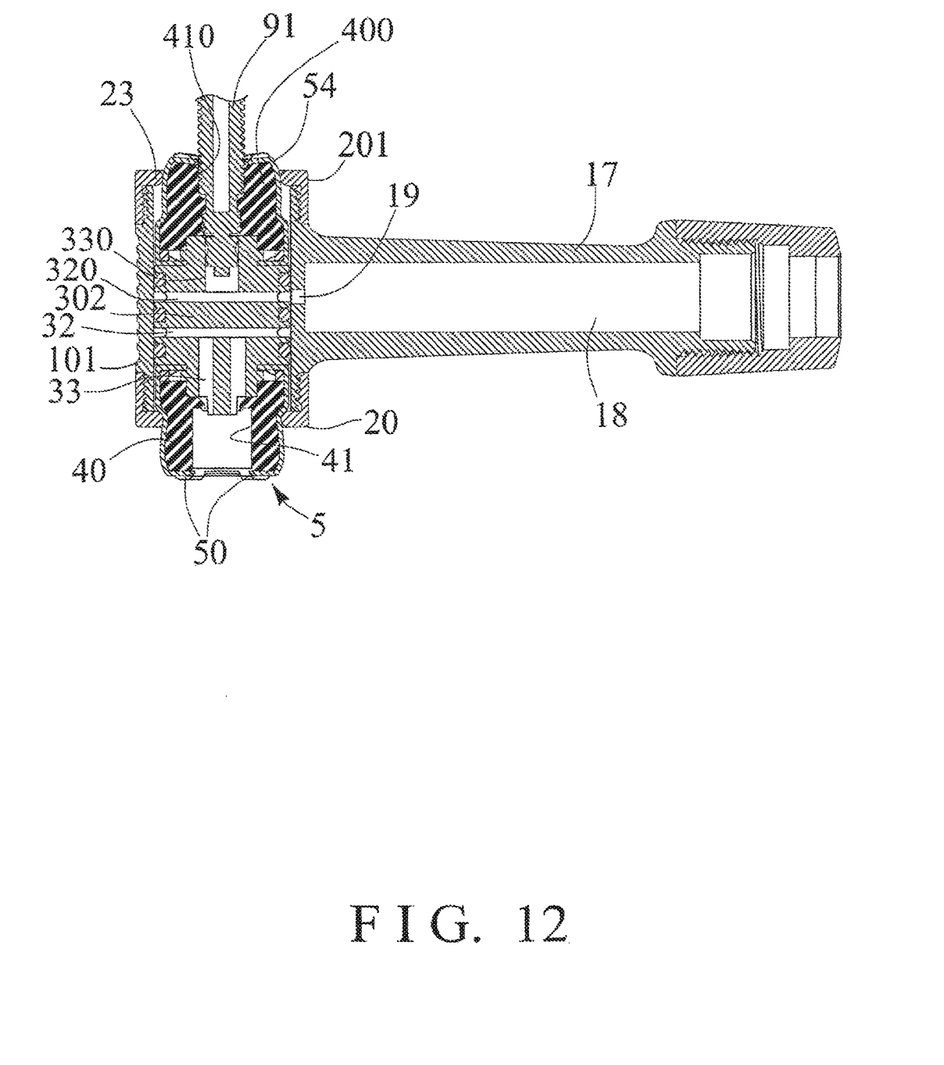

Alternatively, as shown in FIGS. 5 and 6, the sliding member 301 may include an opening or mouth 330 of different types or styles or shapes or configurations formed therein for selectively engaging with the other inflation valve 91, such as the French type 91, the U.S. type valve or the other inflation valve or the like. The gasket 400 may also include a bore 410 formed therein and communicating with the mouth 330 of the sliding member 301 for selectively receiving or engaging with the inflation valve 91 and for allowing the inflation valve 91 to be engaged through the bore 410 of the gasket 400 and to be engaged with the mouth 330 of the sliding member 301. The gasket 400 and the sliding member 301 may also be forced and moved into the chamber 11 of the housing 10 with the inflation valve 91 or the like, and retained in the chamber 11 of the housing 10 with the peripheral rib 23 of the housing 10 or of the cover 20.

Further alternatively, as shown in FIGS. 7-12, the housing 101 may include an outer thread 12, 120 formed in both the lower and the upper end portions 13, 15 thereof (FIG. 7) for threading or engaging with the covers 20, 201 respectively, and the sliding member 302 may include two pathways 32, 320 laterally formed in the middle or intermediate portion of the sliding member 302 for selectively aligning or communicating with the passage 19 and the bore 18 of the cylindrical casing 17, best shown in FIGS. 9-12, and for selectively receiving or obtaining the pressurized air from the air reservoir or hand-held air pump (not illustrated) or the like. The sliding member 302 includes two openings or mouths 33, 330 formed in both the lower and the upper end portions thereof and communicating with the pathways 32, 320 of the sliding member 302 respectively for allowing the pressurized air to selectively flow from the pathways 32, 320 to the mouths 33, 330 of the sliding member 302 and then to flow out of the sliding member 302 selectively.

The mouths 33, 330 of the sliding member 302 are formed and arranged and shaped and provided for receiving or engaging with different inflation valves 90, 91, such as the U.S. type valves, the French type, or the other inflation valves or the like. Two grasping devices 5 are provided and attached to the lower and the upper end portions of the sliding member 302 respectively and moved in concert with the sliding member 302, and each include one or more (such as four) spring blades or jaws or pawls 50 engaged with the gasket 40, 400 for selectively squeezing and compressing the gasket 40, 400 to resiliently clamp and grasp the inflation valves 90, 91 to the sliding member 302 respectively. The peripheral rib 23 of the housing 10 or of the cover 20 may also be used to contact or engage with the tilted or curved lower portions 54 of the pawls 50 for selectively forcing the pawls 50 to selectively squeeze or compress the gasket 40, 400 toward the inflation valve 90, 91, and thus for resiliently clamping or grasping the inflation valve 90, 91 to the sliding member 302.

Accordingly, the air valve connecting device in accordance with the present invention includes a simplified structure for easily connecting to various inflation valves and for being easily actuated or operated with a single hand of the user and having an automatic gripping structure for being easily manufactured with a decreased manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. An air valve connecting device comprising:
a housing including a chamber formed in said housing, and including a first end portion, and including a second end portion, said housing including a passage formed in said housing and communicating with said chamber of said housing,
a cover attached to said first end portion of said housing, and said cover including a peripheral rib extended radially and inwardly into said cover,
a sliding member slidably engaged in said chamber of said housing, said sliding member including a pathway laterally formed in said sliding member for selectively aligning and communicating with said passage of said housing, and said sliding member including a mouth formed in said sliding member and communicating with said pathway of said sliding member for selectively engaging with an inflation valve,
a gasket attached to said sliding member and including a bore formed in said gasket and communicating with said mouth of said sliding member for selectively engaging with said inflation valve, and
a grasping device including a plurality of pawls engaged with said gasket, said pawls each including a lower portion extendible out of said first end portion of said housing for selectively engaging with said peripheral rib of said cover, and said peripheral rib of said cover being engaged with said lower portions of said pawls for selectively forcing said pawls radially inward and toward each other and to compress said gasket to engage with said inflation valve, and to resiliently clamp and grasp said inflation valve to said sliding member when said gasket and said pawls are moved into said chamber of said housing,
wherein said gasket includes a peripheral recess formed in an outer peripheral portion of said gasket, and said pawls each include a protrusion extended radially and inwardly and engaged with said peripheral recess of said gasket.

2. An air valve connecting device comprising:

a housing including a chamber formed in said housing, and including a first end portion, and including a second end portion, said housing including a passage formed in said housing and communicating with said chamber of said housing, a cover attached to said first end portion of said housing, and said cover including a peripheral rib extended radially and inwardly into said cover, a sliding member slidably engaged in said chamber of said housing, said sliding member including a pathway laterally formed in said sliding member for selectively aligning and communicating with said passage of said housing, and said sliding member including a mouth formed in said sliding member and communicating with said pathway of said sliding member for selectively engaging with an inflation valve, a gasket attached to said sliding member and including a bore formed in said gasket and communicating with said mouth of said sliding member for selectively engaging with said inflation valve, and a grasping device including a plurality of pawls engaged with said gasket, said pawls each including a lower portion extendible out of said first end portion of said housing for selectively engaging with said peripheral rib of said cover, and said peripheral rib of said cover being engaged with said lower portions of said pawls for selectively forcing said pawls radially inward and toward each other and to compress said gasket to engage with said inflation valve, and to resiliently clamp and grasp said inflation valve to said sliding member when said gasket and said pawls are moved into said chamber of said housing, wherein said gasket includes a plurality of bulges extended radially and outwardly for forming a plurality of depressions in an outer peripheral portion of said gasket and for engaging with said pawls respectively.

3. The air valve connecting device as claimed in claim 2, wherein said pawls each include an ear extended radially and inwardly and engaged into said sliding member for anchoring said gasket and said pawls to said sliding member.

4. The air valve connecting device as claimed in claim 2, wherein said pawls each include a flap extended radially and inwardly and engageable with said gasket for anchoring said gasket and said pawls to said sliding member.

5. The air valve connecting device as claimed in claim 2, wherein said sliding member includes a knob provided on top of said sliding member and extendible out of said second end portion of said housing.

6. The air valve connecting device as claimed in claim 2, wherein said housing includes an outer thread formed in said first end portion of said housing, and said cover includes an inner thread formed in said cover for engaging with said outer thread of said housing and for detachably securing said cover to said housing.

* * * * *